Figure 1:
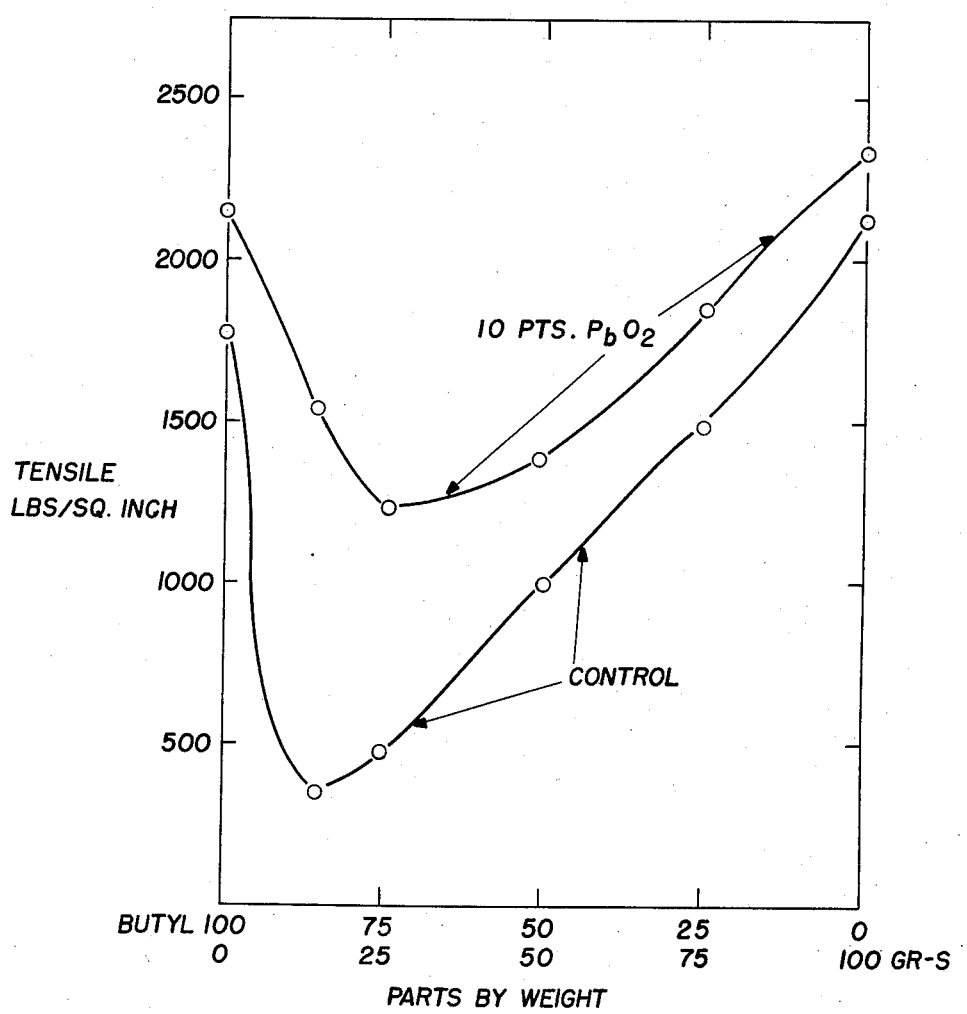
Figure 2:
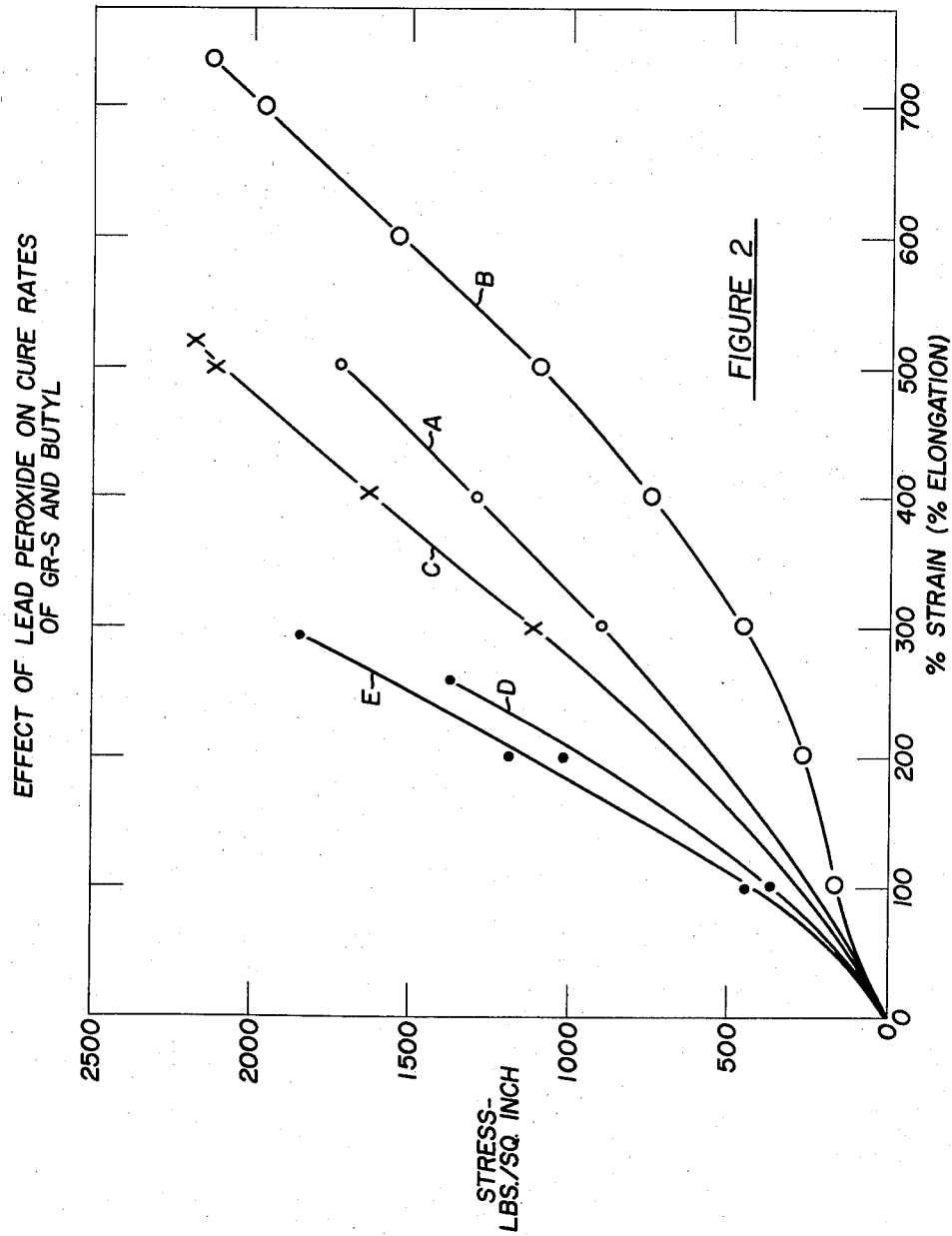
Figure 3:
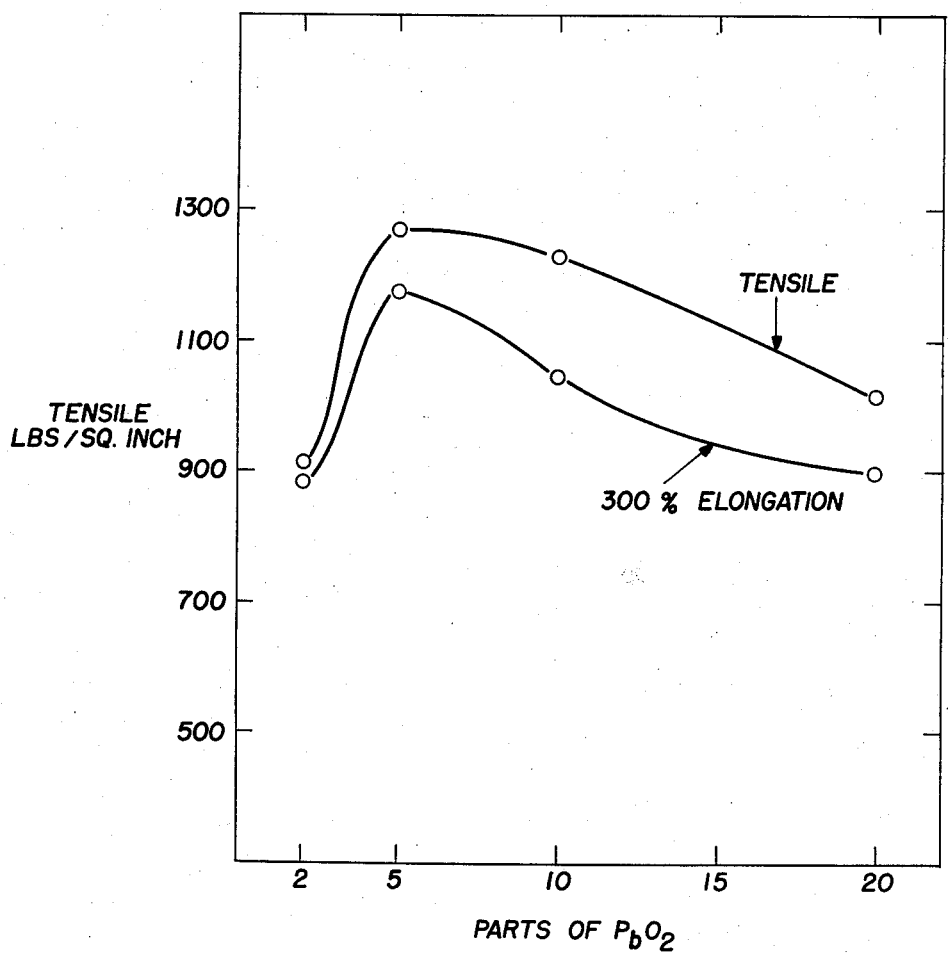
Figure 4:
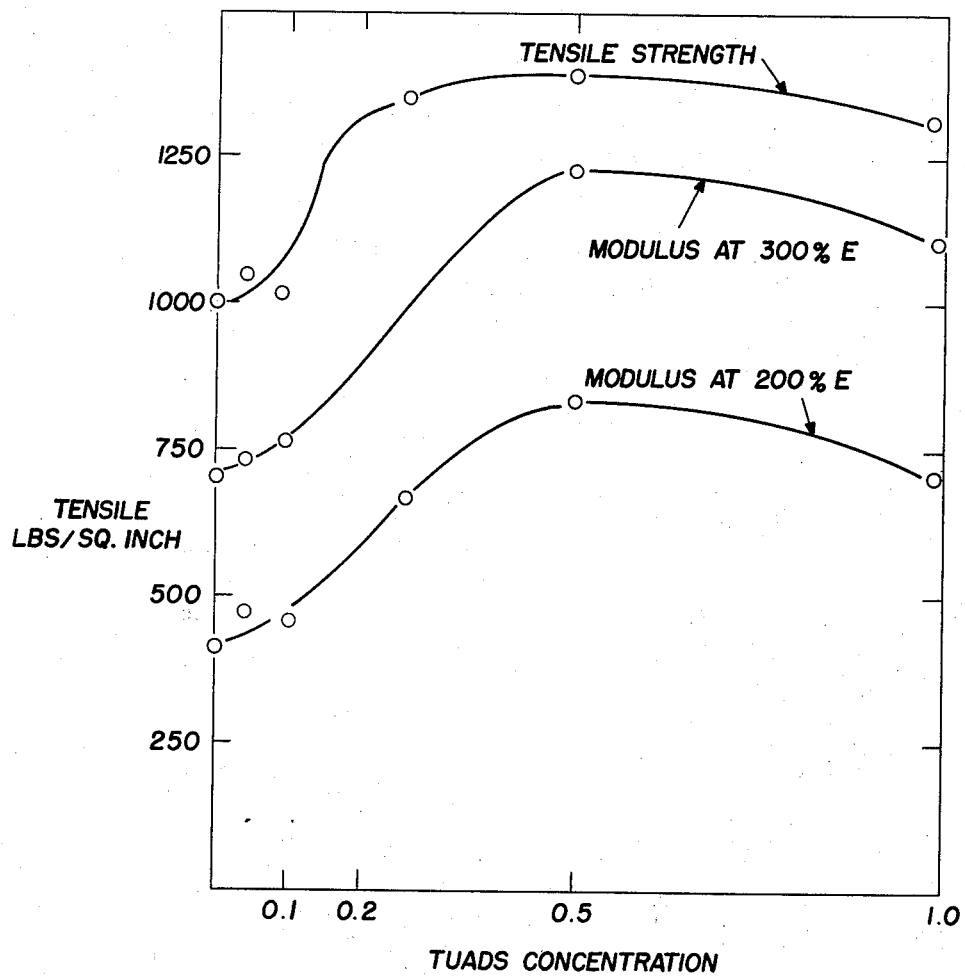
Figure 5:
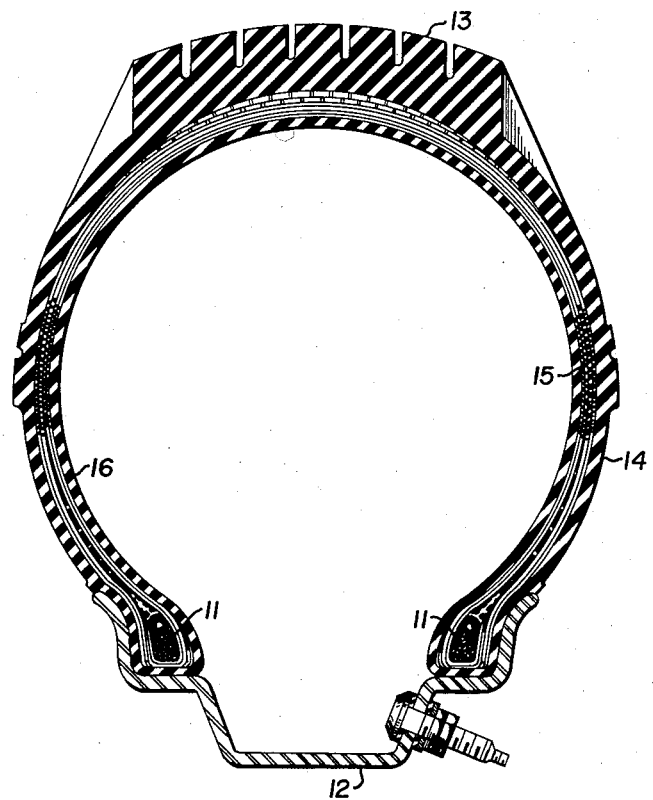

Sept. 29, 1959       F. P. FORD       2,906,313
CO-VULCANIZABLE COMPOSITION OF BUTYL RUBBER WITH HIGHLY
UNSATURATED RUBBERS, PROCESS OF VULCANIZING SAID
COMPOSITION AND VULCANIZED PRODUCT
Filed May 2, 1955                    5 Sheets-Sheet 5

Francis P. Ford    Inventor

By  W. H. Smyers   Attorney

United States Patent Office 2,906,313
Patented Sept. 29, 1959

2,906,313

CO-VULCANIZABLE COMPOSITION OF BUTYL RUBBER WITH HIGHLY UNSATURATED RUBBERS, PROCESS OF VULCANIZING SAID COMPOSITION AND VULCANIZED PRODUCT

Francis P. Ford, Watchung, N.J., assignor to Esso Research and Engineering Company, a corporation of Delaware Application May 2, 1955, Serial No. 505,167

19 Claims. (Cl. 152—330)

This invention relates to new and useful co-vulcanizable admixtures of Butyl rubber and highly unsaturated rubbers and to methods for curing mixtures of Butyl rubber with more highly unsaturated rubbers in the presence of conventional curing agents such as sulfur (and/or sulfur-containing compounds), zinc oxide, and ultra-accelerators, especially of thiuram and carbamic acid derivatives.

The present invention relates more particularly to processes for producing co-vulcanizable mixtures and co-vulcanizing said mixtures which are of Butyl rubber with natural rubber, rubbery copolymers of butadiene and styrene (GR–S rubber) and/or rubbery copolymers of butadiene and acrylonitrile (Buna-N rubber) with sulfur and/or sulfur-containing curatives in the presence of lead compounds. The lead compounds of the present invention are generally characterized by being inorganic and organic lead compounds containing oxygen and especially available lead monoxide. The use of the above lead compounds, in accordance with the present invention, is especially effective when using accelerators of the type known as "ultra accelerators." These ultra-accelerators have been used almost exclusively for the vulcanization of Butyl rubber.

A general process according to the present invention comprises forming a composition comprising an admixture of Butyl rubber and at least one other highly unsaturated rubber, sulfur, and about 2–30 wt. percent (preferably about 3–20 wt. percent) of a lead compound containing oxygen and advantageously at least about 25% (and preferably at least about 40%) available lead monoxide, about 0–50 wt. percent of a basic metal compound such as ZnO, and a vulcanization ultra-accelerator. The above new and useful co-vulcanizable composition is then sulfur-cured at a temperature of about 250°–400° F. for about a minute up to about several hours or more to give improved co-vulcanizates.

By such a process as the above, new and improved co-vulcanizable rubbery compositions are formed by compounding unvulcanized Butyl rubber, Butyl reclaim, and/or partially vulcanized Butyl rubber with the above lead compounds, a highly unsaturated natural rubber, GR–S rubber and/or Buna-N rubber, vulcanizing quantities of sulfur and/or a sulfur-containing curing agent and optionally but preferably with conventional amounts (i.e. about 0–30 parts, preferably about 5–10 parts by wt. per 100 parts by wt. of total rubber hydrocarbon) of basic metal compounds including bivalent metal oxides such as zinc oxide, about 0–5 parts by wt. of vulcanization ultra-accelerators such as thiuram derivatives, alkyl thio-carbamates such as diethyl dithio-carbamate, zinc dithio-carbamate, etc.

It has heretofore been considered impossible to obtain satisfactory vulcanizates from blends of Butyl rubber and more highly unsaturated rubbery polymers such as GR–S, natural rubber or Buna-N rubber, especially where the amount of highly unsaturated rubber polymer is greater than about 4% by weight. Heretofore, the blend of Butyl rubber and more highly unsaturated rubbers when vulcanized have produced a product wherein severe blistering occurs and wherein the porosity of the vulcanizates is high. In general, the vulcanized products of such blends are not homogeneous and are laminated. Furthermore, their tensile strengths are inferior and they tend to crack and peel.

The inability of ordinary Butyl rubber to cure with all proportions of highly unsaturated rubbers such as natural rubber, GR–S, Buna-N, etc., is pointed out in the 1954 edition of "Synthetic Rubber" by G. S. Whitby and in such patents as U.S. No. 2,631,984 and U.S. No. 2,681,899, and others, wherein it is stated that there is a substantial inability of Butyl rubber and other highly unsaturated rubber to co-vulcanize, etc.

The failure of Butyl rubber to satisfactorily cure with all proportions of other common rubbers such as natural rubber, GR–S, Buna-N, etc., has been a serious obstacle to the more extensive use of Butyl rubber in rubber-containing articles such as various laminated structures including flexible rubber belts, hosing, and rubber tires, where in many instances, a blend of various rubbers is desirable, but only if the rubbers are compatible with one another and may be adhesively joined, co-vulcanized, etc.

The discovery of the present invention has been particularly surprising since it is hereinafter shown that lead compounds and especially lead compounds which contain available lead monoxide (such as lead dioxide), retard the curing rate of Butyl rubber. It has heretofore been commonly believed that the large discrepancy in curing rates of Butyl rubber compared to GR–S or natural rubber was a prime factor in causing poor vulcanizates of admixtures of Butyl rubber with such other rubbers and further believed that the presence of any materials which retarded the curing rate of Butyl rubber such as lead compounds containing available lead monoxide would widen the curing rate discrepancy between Butyl rubber and highly unsaturated rubbers. Therefore, the finding of the present invention that the use of lead compounds containing available lead monoxide renders Butyl rubber satisfactorily co-vulcanizable with highly unsaturated rubbers is most unexpected in view of the above.

It is a further discovery of the present invention that the use of lead compounds containing oxygen and especially compounds containing available lead monoxide, while retarding the curing rate of Butyl rubber per se in fact accelerate the curing rate of admixtures of Butyl rubber with highly unsaturated rubbers such as GR–S, natural rubber, Buna-N rubber, etc. In fact, the curing rate of the rubbery blends of the present invention is higher than the curing rate of either of the component rubbers.

It has now been discovered that high quality sulfur-vulcanized blends of Butyl rubber and any amount of the more highly unsaturated rubbers can be produced providing a particular class of modifying agents (co-vulcanization agents) be used in the sulfur-vulcanization process. These modifying agents are lead compounds which are generally characterized by the availability of lead monoxide (PbO). The lead compounds of the present invention are generally selected from the groups consisting of oxides of lead, organic acid esters of lead, and inorganic lead salts containing oxygen especially in the anionic portion thereof, such as monohydrous tribasic lead sulfates, basic lead silicate sulfates, dibasic lead phosphites, etc. Specific desirable compounds are, for example, PbO, $Pb_3O_4$, $Pb_2O_3$, $PbO_2$, lead salicylate, monohydrous tribasic lead maleate, dibasic lead stearate, dibasic lead phthalate, normal lead stearate, and the like.

As pointed out heretofore, the lead compounds of the present invention are particularly effective in conjunction with the so-called "ultra accelerators." Typical accelerators of this type are, for example, Tuads (tetra methyl thiuram disulfide) or Tellurac (tellurium diethyl dithiocarbamate). In general, the above classes of ultra accelerators heretofore utilized in the curing of Butyl rubber are satisfactory in conjunction with the above lead and oxygen containing compounds.

The invention will be demonstrated hereinafter with reference to the accompanying drawings, in which:

Figure I is a graphical representation indicating the improvement in tensile strength of co-vulcanizates of Butyl rubber and GR-S rubber made according to the present invention;

Figure II is a graphical representation in the form of a stress-strain diagram showing the improvement in curing rate (curing efficiency) of admixtures of Butyl rubber and GR-S rubber as compared to GR-S rubber and Butyl rubber per se. Said representation is employed to show that the use of compounds containing lead and oxygen according to the present invention increase the curing rate and curing efficiency of blends of Butyl rubber and GR-S rubber whereas the use of the same compounds containing lead and oxygen decreases the curing efficiency and curing rate of Butyl rubber per se;

Figure III is a graphical representation showing the effect of the concentration of one of the lead and oxygen-containing compounds of the present invention (i.e. lead dioxide) on the stress-strain properties of co-vulcanized blends of Butyl rubber and GR-S rubber;

Figure IV is a graphical representation showing the effect of the use of an ultra accelerator (tetra methyl thiuram disulfide) on the stress-strain properties of co-vulcanizates of Butyl rubber and GR-S rubber. Said representation is employed to show the fact that when compounds according to the present invention containing lead and oxygen are added to vulcanizable admixtures of Butyl rubber and GR-S rubber, the concentration of any added ultra vulcanization accelerator is not critical; and Figure V is a cross-sectional view of a pneumatic tubeless tire employing therein a Butyl rubber co-vulcanized with other highly unsaturated rubbers according to the present invention, wherein the tire is shown as being mounted on a conventional tire wheel rim.

The Butyl rubber of the present invention generally comprises a copolymer of a major proportion of an olefin such as relatively low molecular weight isoolefin (e.g. isobutylene) and a minor proportion of a multi-olefin, preferably having a ratio of the isoolefin to the multi-olefin of about 90–99.5% to about 10–0.5% respectively. Copolymers of the above general type, especially where the copolymer is above about 85% (and especially above about 90%) to about 99.5% of a $C_4$–$C_7$ isoolefin such as isobutylene with about 15–0.5% (preferably about 10–0.5%) of a multiolefin of about 4–14 carbon atoms are commonly referred to in patents and literature as "Butyl rubber" or GR-I rubber (Government Rubber-Isobutylene) and, for example, is referred to as "Butyl Rubber" in patents and in textbook "Synthetic Rubber" by G. S. Whitby (1954) edition by John Wiley & Sons, Inc., pages 608–609, etc. The preparation of Butyl-type rubbers is described in U.S. Patent 2,356,128 to Thomas et al. and also in other patents as well as in literature. In general the rubber comprises the reaction product of a $C_4$–$C_7$ isoolefin (preferably isobutylene) with a $C_4$–$C_{10}$ multi-olefin such as, isoprene, butadiene, dimethyl butadiene, myrcene, piperylene, allocimene, etc. The reaction product of isobutylene and isoprene is preferred.

In general, the polymer has a Staudinger molecular weight within the range between about 20,000 and 100,000. The viscosity average molecular weight is preferably above about 300,000 up to about 1,500,000 or higher. The iodine number (Wijs) is in the range from about 1 to 50, preferably in the range from about 1 to 20. The above copolymer when cured has good elasticity, tensile strength, abrasion resistance and flexure resistance. The butyl copolymer may be compounded with various fillers, pigments, plasticizers and anti-oxidants.

Typical highly unsaturated rubbers for use in the blend of the present invention as mentioned heretofore, are a copolymer of butadiene and styrene (GR–S), natural rubber, and Buna-N rubber which is the reaction product of butadiene and acrylonitrile.

(GR–S) is preferably obtained by polymerizing butadiene and styrene in aqueous emulsion. Polymerization is initiated by bringing the monomer mixture to a temperature between about $-40°$ C. and about $+100°$ C., preferably between about $-40°$ C. to about $+50°$ C., in the presence of a substance capable of accelerating the reaction such as peroxide or persulfate with or without added solvents. When polymerization is complete the polymer is separated from unreacted monomer and/or solvent and water generally by distillation.

The above general process for producing GR–S rubber may likewise be generally employed for producing Buna-N rubber, which is a copolymer of butadiene and acrylonitrile and other rubber polymers as hereinafter indicated. It may be applied, for example, to polymers obtained by the polymerization in aqueous emulsion of conjugated diolefins, such as butadiene, isoprene, piperylene, dimethyl butadiene, 2-chlorobutadiene-1,3, taken singly or in combination, or to emulsion copolymerizates obtained by polymerizing such diolefins in combination with unsaturated comonomers, i.e., copolymerizable compounds containing a single terminal methylene group such as styrene (above), and also homologues of styrene, such as alpha methyl styrene, para methyl styrene, alpha methyl para methyl styrene, nitriles of low molecular weight unsaturated acid such as acrylonitrile (above), methacrylonitrile, chloroacrylonitrile, methyl acrylate, methyl methacrylate and ketones such as methyl vinyl ketone or mixtures thereof.

Other highly unsaturated synthetic rubbers employed according to the present invention may be polymers of substituted butadienes-1,3 which include butadiene-1,3 or its homologs such as isoprene and 2,3-dimethyl butadiene, where the substituents are either chlorine or cyano groups, or the synthetic rubbers may be rubbery copolymers of various of the butadienes-1,3 with other ethylenic monomers, and in this case either the butadienes or the ethylenic monomer or both the butadienes and the ethylenic monomer may contain substituents of chlorine or cyano groups. The copolymer generally contains at least 50% by weight of one of the butadienes-1,3. Such compounds useful in the present invention include polymers of 3-chloro butadiene-1,3, 3-bromo butadiene-1,3; 3-cyano butadiene-1,3 chloro isoprene, bromo isoprene, and cyano isoprene. They also include polymers of butadiene-1,3 with vinylidene chloride, p-chloro styrene, or methyl alpha chloro acrylate; copolymers of 3-chloro butadiene-1,2 with the above and/or with acrylonitrile, methacrylonitrile, etc.; copolymers of 3-cyano butadiene-1,3 with the above; copolymers of 2,3-dimethyl butadiene with either 3-chloro butadiene-1,3 or 3-cyano butadiene-1,3 etc. Those compounds which are copolymerized with the butadienes are preferably ethylenic monomers and it is preferred that they contain a $CH_2=C<$ group. This is not absolutely necessary, however, as ethylenic monomers containing only one or more $>C=C<$ groups are also workable. Vulcanization may be obtained either at ordinary room temperature or at higher temperatures, depending upon the choice of vulcanization accelerators.

The respective quantities of the Butyl rubber utilized in conjunction with the highly unsaturated rubber or rubbers may vary appreciably, as for example, 99% by weight of Butyl to 1% by weight of the unsaturated rubber; to 1% of Butyl and 99% by weight of the unsaturated rubber. The proportions of each component used will depend to a great extent upon the ultimate use for which the product is designed. It is to be understood that the Butyl rubber may comprise any proportion of Butyl reclaim rubber, partially vulcanized Butyl rubber etc., alone or in conjunction with Butyl rubber.

The amount of lead compound used may likewise vary appreciably. In general, it is advantageous to use about 3 to 30 weight percent and preferably 3-4 to 20 weight percent based upon the total amount of rubber present.

The amount of accelerator used will vary somewhat depending upon the particular compound used. In general, it is preferred to use 0.1 to 2 parts by weight of an ultra accelerator based upon the amount of rubber. The vulcanization conditions may vary in the range from about 250 to 400° F., preferably at about 280 to 320° F., for about a minute up to about several hours or more. Preferred times are from about 10 minutes to 2 hours.

In order to more fully illustrate the invention, the following examples are given wherein reference is made to the drawings:

Example I

A master batch of Butyl and GR–S rubber, together with conventional fillers and curing agents was prepared of the following composition.

Composition: Parts by weight
- Butyl rubber (GR–I–17) — 75
- GR–S rubber — 25
- Gastex (S.R.F. Black) — 50
- Zinc oxide — 5.0
- Stearic acid — 0.5
- Tetra methyl thiuram disulfide — 1.0
- Sulfur — 3.0

Eighteen portions of the above composition were cured at 307° F. for 40 minutes in the presence of 5 parts by weight of various co-vulcanization agents, some of which contained lead monoxide. The results of these tests were as follows:

| Portion | Co-vulcanization agent Active | P.s.i. tensile | Available PbO content |
|---|---|---|---|
| 1 | PbO | 1,170 | 100 |
| 2 | $Pb_3O_4$ | 1,250 | 100 |
| 3 | $Pb_2O_3$ | 1,220 | 100 |
| 4 | $PbO_2$ | 1,315 | 100 |
| 5 | Normasol (normal lead salicylate) | 980 | 46 |
| 6 | Tribase (monohydrous tribasic lead sulfate) | 1,300 | 67 |
| 7 | Tribase E (basic lead silicate sulfate) | 1,080 | 45 |
| 8 | White lead | 1,185 | |
| 9 | Trimal (monohydrous tribasic lead maleate) | 1,215 | 66 |
| 10 | Dythal (dibasic lead phthalate) | 1,215 | 82 |
| 11 | Lead star (normal lead stearate) | 1,115 | |
| 12 | Dyphos (dibasic lead phosphite) | 1,310 | |
| 13 | DS–207 (dibasic lead stearate) | 1,275 | |
| | Inactive | | |
| 14 | $MnO_2$ | 610 | 0 |
| 15 | Barinac (barium ricinoleate) | 430 | 0 |
| 16 | Calstar (normal calcium stearate) | 315 | 0 |
| 17 | HgO | 680 | 0 |
| 18 | BaO | 535 | 0 |

From the above, it is apparent that the compositions (portions) containing lead compounds having available lead monoxide produce products having satisfactory tensile strengths of about 1,000 to 1,300 p.s.i., while other compounds did not (i.e., other compounds had tensile strengths of about 300–700 p.s.i.). Satisfactory tensile strengths are those above about 1000 p.s.i. Furthermore, the rubbery products shown in portions 1 through 13 were dense, homogeneous, rubbery products, while the other portions were porous, non-homogeneous mixtures.

Example II

The following three batches (A, B, C) were compounded on a laboratory mill:

| A | | B | | C | |
|---|---|---|---|---|---|
| Natural rubber (smoked sheet) | 100 | Butyl rubber (GR–I–17) | 100 | Butyl reclaim | 166 |
| Zinc oxide | 5 | Carbon black (MPC black) | 50 | Zinc oxide | 3 |
| Sulfur | 3 | Stearic acid | 0.5 | Tuads (supra) | 1.25 |
| Stearic acid | 1 | Zinc oxide | 5 | $PbO_2$ | 10 |
| Captax (2-mercaptobenzothiazole) | 1 | Tuads (tetramethyl thiuram disulfide) | 1.25 | | |
| | | Sulfur | 2 | | |

The above batches were then blended in the following proportions by weight, and subsequently subjected to vulcanization at 307° F. for 30 minutes.

| Batch | Compositions | | | | | |
|---|---|---|---|---|---|---|
| | 1 | 2 | 3 | 4 | 5 | 6 |
| A | 3 | 3 | 3 | 9 | 9 | 9 |
| B | | 90 | 45 | | 90 | 45 |
| C | 90 | | 45 | 90 | | 45 |

The following physical properties were obtained:

| | Stress-strain properties | | | | | |
|---|---|---|---|---|---|---|
| | 1 | 2 | 3 | 4 | 5 | 6 |
| Tensile modulus at— | | | | | | |
| 100% elong., p.s.i. | 120 | 255 | 190 | 140 | 210 | 200 |
| 200% elong., p.s.i. | 210 | 400 | 370 | 250 | 290 | 350 |
| 300% elong., p.s.i. | 380 | 600 | 630 | 425 | 350 | 535 |
| 400% elong., p.s.i. | 600 | 820 | 960 | 655 | 395 | 770 |
| 500% elong., p.s.i. | 840 | 1,070 | 1,340 | 750 | | 1,050 |
| 600% elong., p.s.i. | | 1,350 | 1,700 | | | |
| Tensile strength, p.s.i. | 1,015 | 1,500 | 1,845 | 1,030 | 435 | 1,295 |
| Elongation, percent | 575 | 645 | 635 | 540 | 480 | 585 |

It will be observed that compositions 1, 3, 4, and 6, which contain $PbO_2$ possess satisfactory physical properties as to tensile strength, tensile modulus and elongation. It is also noted that compositions 2 and 5 contained no $PbO_2$. Composition 2 contained only a modicum of natural rubber (i.e. 4.5%) based on the total rubber hydrocarbon content. Nevertheless, the vulcanized pad had a peculiar porous, cracked and non-homogeneous appearance associated with "contaminated" butyl. Composition 5 containing 13.5% natural rubber on total rubber hydrocarbon was very badly blistered. Its very poor physical properties also demonstrate that it was of substantially no value as a rubber vulcanizate.

Example III

The following batches were prepared as in Example II.

| A | | B | | C | |
|---|---|---|---|---|---|
| Natural rubber smoked sheet | 100 | Butyl rubber (GR–I–17) | 100 | Butyl reclaim | 166 |
| Zinc oxide | 5 | Stearic acid | 0.5 | Zinc oxide | 3 |
| Sulfur | 3 | Zinc oxide | 5.0 | Tuads (supra) | 1.25 |
| Stearic acid | 1 | Tuads (tetramethyl thiuram disulfide) | 2 | Sulfur | 1 |
| Captax (2-mercaptobenzothiazole) | 1 | Sulfur | 2 | | |
| | | Carbon black (MPC black) | 50 | | |

The above batches were blended in the following proportions and the compositions subjected to vulcanization for 30 minutes at 307° F. as in Example II.

| Batch | Composition | | | | | |
|---|---|---|---|---|---|---|
| | 1 | 2 | 3 | 4 | 5 | 6 |
| A | 9 | 9 | 9 | 9 | 9 | 9 |
| B | | | 90 | 90 | 45 | 45 |
| C | 90 | 90 | | | 45 | 45 |
| PbO$_2$ | | 5 | | 5 | | 5 |

Compositions 1 and 2 were prepared from Butyl reclaim and contained 14.2 weight percent of natural rubber (smoked sheet) on total rubber hydrocarbon. Compositions 3 and 4 were prepared from GR–I–17 Butyl rubber and contained 12.6 weight percent smoked sheet based on total rubber hydrocarbon. Compositions 5 and 6 were prepared from a blend of GR–I–17 Butyl polymer and Butyl reclaim and contained 13 weight percent smoked sheet on total rubber content.

The following physical properties were obtained:

| | Stress-Strain Properties | | | | | |
|---|---|---|---|---|---|---|
| | 1 | 2 | 3 | 4 | 5 | 6 |
| Tensile modulus at— | | | | | | |
| 100% elongation, p.s.i | 140 | 170 | 290 | 280 | 220 | 285 |
| 200% elongation, p.s.i | 220 | 345 | 380 | 500 | 330 | 530 |
| 300% elongation, p.s.i | 370 | 570 | 480 | 760 | 450 | 820 |
| 400% elongation, p.s.i | 530 | 810 | 600 | 1,030 | 550 | 1,120 |
| 500% elongation, p.s.i | | | 700 | 1,425 | | |
| 600% elongation, p.s.i | | | | 1,750 | | |
| Tensile strength, p.s.i | 550 | 1,035 | 720 | 1,870 | 550 | 1,440 |
| Elongation, percent | 410 | 495 | 560 | 635 | 435 | 485 |

Compositions 1, 3 and 5 containing no PbO$_2$ were porous and blistered when removed from mold. The low physical properties indicate that an unsatisfactory state of vulcanization had been obtained. On the other hand, compositions 2, 4 and 6 containing PbO$_2$ possessed a desirable appearance and physical properties and were extremely useful vulcanizates.

The above demonstrates that blends of conventional formulations of Butyl rubber and natural rubber do not co-vulcanize satisfactorily and further demonstrates that the addition of PbO$_2$ to such compositions will permit the preparation of good vulcanizates.

*Example IV*

Various blends of Butyl rubber and GR–S were prepared, which had the following composition:

| | |
|---|---|
| Total rubber hydrocarbon | 100 |
| SRF Black | 50 |
| Zinc oxide | 5 |
| Stearic acid | 0.5 |
| Tuads (tetramethyl thiuram disulfide) | 1–0 |
| Altax (2–2', benzothiazyl disulfide) | 0–1 |
| Sulfur | 2 |
| PbO$_2$ | (10) |

The data obtained with these blends are plotted in Figure I, which represent all proportions of the two rubbers. The upper curve of Figure I shows Butyl rubber-GR–S blends cured with 10 parts of lead dioxide. The tensile strengths varied from about 2300 p.s.i. down to about 1200 p.s.i. The lower curve shows identical Butyl rubber-GR–S blends cured in the absence of lead compounds. The tensile strengths vary from about 2200 p.s.i. down to about 300 p.s.i. The lower limit is completely unsatisfactory for blended vulcanizates.

It is also evident from Figure I, that when using PbO$_2$ the lowest tensile strength is secured when the concentration of GR–S in Butyl is in the range from about 10% to 40% by weight. However, even in this range the tensile strength is well above the desired tensile strength of about 1000. On the other hand, Figure I shows that in all cases the tensile strength of the PbO$_2$ blend is well above the tensile strength when not using PbO$_2$. Furthermore, in the range specified, when not using PbO$_2$, the tensile strength is entirely unsatisfactory and such blends gave porous, blistered, non-homogeneous vulcanizates which are of no practical value.

*Example V*

Additional tests were carried out as illustrated in curves A, B, C, D, and E of Figure II. This figure is a stress-strain plot which illustrates the relative rate of curing of several rubber compositions. Curve A is a conventional 100% Butyl composition (GR–I–17). Curve B is the identical composition of curve A, except it contains 10 parts by weight of PbO$_2$. It is evident that the addition of the PbO$_2$ retards the rate of curing.

Curve C represents 100% GR–S. This curve serves as a control. Curve D is a composition comprising 50% GR–S and 50% GR–I–17. Curve E represents a composition comprising 75% GR–S and 25% GR–I–17. These latter two compositions also contain 10 parts by weight of PbO$_2$.

From Figure II it is evident that the addition of PbO$_2$ accelerates the rate of curing of blinds of GR–S and Butyl rubber. Also, curve B compared to curve A shows that the use of lead dioxide greatly retards the curing rate of Butyl rubber per se. Furthermore, a comparison of curves D and E (which are compositions produced according to the present invention) with curves A, B, or C, shows that the curing rate of blends of Butyl rubber and GR–S rubber containing lead dioxide is surprisingly much faster than the curing rate of GR–S alone or GR–I–17 alone. It is also much faster than the curing rate of GR–I–17 per se in the presence of lead dioxide.

*Example VI*

A number of compositions were prepared wherein the amount of lead oxide was varied. The basic composition was as follows:

| | |
|---|---|
| GR–I–17 | 75 |
| GR–S | 25 |
| SRF Black | 50 |
| Zinc oxide | 5 |
| Tuads (tetramethyl thiuram disulfide) | 0.75 |
| Altax (2–2', benzothiazyl disulfide) | 0.25 |
| Sulfur | 2 |

The results were plotted as shown in Figure III. It is to be noted that at 300% elongation, the amount of PbO$_2$ should be in the range of about 2 to 20, preferably of from about 5 to 10 parts per 100 parts of rubber.

*Example VII*

Seventy-five parts by weight of Butyl rubber (GR–I–17) and 25 parts by weight of Buna-N rubber (Paracril 18) were admixed with the various compounds hereinafter shown and in the case of run 1, cured for 40 minutes at 307° F. in the absence of lead compounds and, in the case of run 2, cured under the same conditions in the presence of 5 parts by weight of lead dioxide. The following tensile modulus and tensile strength were observed:

| | 1 (control) | 2 |
|---|---|---|
| GR–I–17 | 75 | 75 |
| Buna-N (Paracril 18) | 25 | 25 |
| Gastex (SRF black) | 50 | 50 |
| Stearic acid | 0.5 | 0.5 |
| Zinc oxide | 5 | 5 |
| Tuads (tetramethyl thiuram disulfide) | 1 | 1 |
| Sulfur | 3 | 3 |
| PbO$_2$ | | 5 |
| Tensile modulus at 100% elongation, p.s.i | 510 | 1,100 |
| Tensile strength, p.s.i | 600 | 1,220 |

From an inspection of the above data, it is noted that the modulus and tensile strength for the Butyl rubber-Buna–N rubber composition, which was cured with lead dioxide, had double the modulus and double the tensile strength of the control. Furthermore, the blended composition of Butyl rubber and Buna–N rubber containing lead dioxide was non-porous, smooth, dense, rubbery and contained no substantial pores, cracks or blisters, whereas the identical blended composition cured without lead dioxide yielded vulcanizates which was substantially non-homogeneous, very blistered, cracked and porous and was an unsatisfactory vulcanizate.

*Example VIII*

A number of compositions were prepared with various amounts of tuads as shown on Figure V. The basic composition was as follows.

Composition:

| | |
|---|---|
| GR–I–17 | 75 |
| GR–S | 25 |
| Carbon Black (SRF Black) | 50 |
| Stearic acid | 0.5 |
| Zinc oxide | 5 |
| Sulfur | 3 |
| $PbO_2$ | 5 |
| Tuads (tetramethyl thiuram disulfide) | as shown |

Figure IV illustrates quite decisvely that the concentration of the accelerators is not critical and can be quite low (0.01%).

*Example IX*

The following illustrates another feature of the present invention, i.e. that high sulfur loading alone, or in combination with the use of lead compounds containing available lead monoxide (such as lead dioxide) produces satisfactory semi-ebonites, especially for compositions of Butyl rubber with GR–S rubber. For example, it has been discovered that hard, yet flexible, blends of butyl rubber and other highly unsaturated rubbers and particularly Buna-type rubbers (GR–S and Buna–N, etc.) can be prepared by increasing the sulfur content to about 10–40 and especially to about 15–25 parts by weight per 100 parts by weight of total rubber hydrocarbon. Such compositions will vulcanize satisfactorily if cured for at least about 10 minutes whether lead dioxide or other lead compounds are used or not. Also, when employing 15 parts to 25 parts of sulfur in the compositions without lead, the vulcanizates are free of cracks and blisters and have a desirable Shore hardness of about 50–100. The compositions are further improved as to appearance when employing the lead compounds according to the present invention as shown below.

The following compositions were prepared on a conventional 6″ x 12″ rubber mill and cured for 40 minutes at 307° F.

slight surface blemishes but were completely free of cracks, blisters and laminated peelings or other signs of incompatible vulcanization. Composition A which was vulcanized as above but in the absence of lead oxide, did not co-vulcanize whereas composition B completely co-vulcanized and was soft and rubbery in nature.

As regards the physical characteristics of compositions A to F, inclusive, the Shore hardness of compositions C to F was about 75–80 which was superior to the Shore hardness of compositions A and B which was in the range of about 30–40. Furthermore, compositions D and F which contained added $PbO_2$ as well as 15 and 25 parts by weight of sulfur respectively, were not only smooth, shiny, homogeneous co-vulcanizates, but were sufficiently flexible that a 0.075″ thick pad could be bent 180° without any cracking whatsoever.

One particularly advantageous use for the Butyl rubber co-vulcanizates of the present invention is in pneumatic tires of either the inner tube containing variety or in a tubeless type tire.

Figure V depicts a pneumatic tubeless tire which comprises a hollow toroidal type member which is substantially U-shaped in cross-section by virtue of an open portion which extends around the inner periphery of the member. In other words, the tire is of a tubular type structure which has a cross-section in the form of an open-bellied body with spaced terminal portions to define a member generally resembling a horseshoe. The terminal portions constitute the bead portions 11—11 of the tire inside of which are a plurality of bead wires adhesively imbedded and molded in a rubber. The outer surface of the bead portion is advantageously formed into an air sealing means, such as a plurality of ribs (not shown) to aid in adhesion to rim 12 when the tire is inflated.

The outer surface of the tire also includes tread area 13 and sidewalls 14. The open portion of the horseshoe-shaped tire faces that portion of the inner circumference of the tire which is adjacent the said area 13 of the tire. The remaining construction of the tire may vary according to conventional fabrication, but in general, the tire is a multilayered type of structure with an outer layer as above-mentioned. The layer next adjacent the outer layer generally comprises a carcass 15 which includes a rubber which has incorporated therein a fabric composed of a plurality of cotton, rayon or nylon cords, etc. The tire also includes an inner lining advantageously made from rubber, e.g. Butyl rubber, natural rubber and/or co-vulcanizates (or partially cured co-vulcanizates) of Butyl rubber and natural rubber, or Butyl rubber with a Buna type rubber or Butyl and Buna preferably with natural rubber, all produced according to the present invention. The inner lining must be substantially impermeable to air. For example, the lining may advantageously comprise natural rubber, neoprene-

| Composition | A | B | C | D | E | F |
|---|---|---|---|---|---|---|
| GR–I–17 | 75 | 75 | 75 | 75 | 75 | 75. |
| GR–S | 25 | 25 | 25 | 25 | 25 | 25. |
| Stearic acid | 0.5 | 0.5 | 0.5 | 0.5 | 0.5 | 0.5. |
| Gastex (SRF black) | 50 | 50 | 50 | 50 | 50 | 50. |
| Zinc oxide | 5 | 5 | 5 | 5 | 5 | 5. |
| Tuads (tetramethyl thiuram disulfide) | 1 | 1 | 1 | 1 | 1 | 1. |
| Sulfur | 3 | 3 | 15 | 15 | 25 | 25. |
| $PbO_2$ | | 5 | | 5 | | 5. |
| Appearance | Very dull [1] | Smooth, shiny, hard [2] | Dull, hard [2] | Smooth, shiny, hard [2] | Dull, hard [2] | Smooth, shiny, very hard.[2] |

[1] Cracked, blistered, peeled, non-homogeneous.
[2] No cracks, blisters, and substantially completely homogeneous.
NOTE.—Shore hardness determined with a Shore durometer (type C).

A visual inspection of the above curved vulcanizates indicates that the vulcanized compounds B, D, and F, are satisfactory in all regards. In addition these blends are non-porous, flexible and not pitted. The surfaces of the cured vulcanizates of compositions C and E had type rubber (i.e., polychlorobutadiene rubber) a rubbery copolymer, or mixtures or co-vulcanizates prepared according to the present invention of any of the above, wherein the copolymer comprises the reaction product of about 20–99.5 weight percent of a $C_4$–$C_7$ iso-olefin, such as isobutylene, and about 0.5–80 weight percent of a $C_4$–$C_{14}$ multi-olefin, such as isoprene which has been at least partially vulcanized. The above multi-layers, at least three in number, are conventionally bonded or otherwise adhered together, for example, by cementing and/or especially by vulcanizaton, co-vulcanization according to the present invention, etc., to form a tire of a unitary structure.

The Butyl rubber co-vulcanized compositions of the present invention may be employed generally throughout the tire and may be used alone or in admixture with natural rubber and/or co-vulcanized rubber or certain synthetic rubbers to include chloroprene rubber, polyisoprene, butadiene or isoprene vinyl pyridine copolymers, and particularly GR–S rubber Buna-N rubber, etc. However, for the inner lining of the tire, ordinary Butyl rubber, Butyl rubber co-vulcanized with natural rubber, natural rubber or mixtures thereof is preferred. Also, wheeas the inner lining may comprise the Butyl-containing rubber compounds before mentioned, the other layers of the tire such as the intermediate carcass layer and/or the outer layer (including the tread area, the sidewall and the outer bead portions, etc.) may comprise Butyl rubber co-vulcanized with other conventionally employed rubbers according to the present invention, such as natural rubber and synthetic rubbers (especially highly unsaturated synthetic rubbers) and mixtures thereof (and reclaimed mixtures thereof) especially to include GR–S rubber, natural rubber and/or Buna-N rubber.

A tubeless tire may comprise a casing of an outer layer including the tread, sidewall, outer bead portions, etc., of Butyl rubber co-vulcanized with natural rubber, natural rubber, GR–S rubber and/or Buna-N rubber or mixtures thereof, reclaimed mixtures of these rubbers or mixtures of Butyl with equivalent highly unsaturated rubbers which have been co-vulcanized. It also preferably comprises an intermediate layer or carcass of the above rubbers or combinations thereof, especially to include compositions containing Butyl rubber, alone or co-vulcanized with natural rubber, GR–S rubber, Buna-N rubber combinations thereof, and their equivalents.

In another embodiment, the inner layer of the tire which may be Butyl rubber alone, Butyl rubber co-vulcanized with saturated rubbers, Butyl rubber co-vulcanized with highly unsaturated rubbers according to the present invention, or an admixture thereof, which has been at least partially vulcanized by heating for about 3–60 mintues or more at about 100° to 350° F. or higher with about 0.2 to 40.0 (especially 1 to 25) weight percent sulfur on a basis of the weight of the total rubber or rubbers as hereinbefore-mentioned and which has been cured with any of the heretofore disclosed curing compositions, especially to include curing compositions comprising sulfur and the hereinbefore disclosed lead compounds containing available lead monoxide and optionally but preferably with an additional bivalent metal oxide, preferably zinc oxide.

While there are above described a number of specific embodiments of the present invention, it is obviously possible to produce other embodiments and various equivalent modifications and variations thereof without departing from the spirit of the invention or the scope of the appended claims.

What is claimed is:

1. A composition comprising a co-vulcanizable admixture of about 25.0–90.0 weight percent of a rubbery coploymer containing a major proportion of a $C_4$–$C_8$ olefin and a minor proportion of a $C_4$–$C_{14}$ multi-olefin with about 10.0 to 75.0 weight percent of a more highly unsaturated rubber, and containing as the sole vulcanizing agents an admixture of zinc oxide, sulfur, a lead compound containing oxygen and a member selected from the group consisting of thiuram sulfides, thiocarbamates and mixtures thereof.

2. A composition comprising a co-vulcanizable admixture of a copolymer containing about 25–90 weight percent of a major proportion of an isoolefin and a minor proportion of a conjugated diolefin, about 10–75 weight percent of a more highly unsaturated rubber, and containing as sole vulcanizing agents an admixture of zinc oxide, a sulfur-containing accelerator, sulfur, and a member selected from the group consisting of oxides of lead, organic acid esters of lead, inorganic lead salts containing oxygen, and mixtures thereof.

3. A composition comprising a co-vulcanizable admixture of about 25–90 weight percent of an isoolefin multiolefin Butyl rubber copolymer, about 10–75 weight percent of another rubber selected from the group consisting of natural rubber, rubbery copolymers of butadiene and styrene, rubbery copolymers of butadiene and acrylonitrile, and mixtures thereof, and, as sole covulcanizing agents, a mixture of a lead compound containing oxygen, sulfur, zinc oxide, and a sulfur-containing accelerator selected from the group consisting of thiuram sulfides, thiocarbamates and mixtures thereof.

4. A composition comprising a co-vulcanizable admixture of about 12.5–45.0 parts by weight of Butyl rubber containing about 85–99.5 weight percent of a $C_4$–$C_7$ isoolefin, and about 15 to 0.5 weight percent of a $C_4$–$C_{10}$ multi-olefin, at least about 5.0–37.5 parts by weight of one other rubber selected from the group consisting of natural rubber, rubbery coploymers of butadiene and styrene, rubbery copolymers of butadiene and acrylonitrile, and mixtures thereof, containing as sole vulcanizing agents about 2 to 50 parts by weight of sulfur, about 3 to 30 parts by weight of a member selected from the group consisting of oxides of lead, organic acid esters of lead, and inorganic lead salts containing oxygen, about 1 to 50 parts by weight of zinc oxide, and about 0.1–5 parts by weight of a sulfur-containing accelerator per 100 parts by weight of total rubber hydrocarbons.

5. A composition comprising a co-vulcanizable admixture of about 25.0–90.0 weight percent of an isoolefin multiolefin Butyl rubber copolymer, at least about 10.0 to 75.0 weight percent of another more highly unsaturated rubber, and containing as the sole vulcanizing agents an admixture of zinc oxide, sulfur, a sulfur-containing accelerator, and sufficient amounts of a lead compound containing oxygen that the composition is co-vulcanizable at a rate in excess of the vulcanization rate of any of the rubbers alone.

6. A vulcanized composition comprising about 25.0–90.0 weight percent of a rubbery polymer containing a major proportion of a $C_4$–$C_8$ isoolefin and a minor proportion of a $C_4$–$C_{14}$ multi-olefin, at least about 10.0 to 75.0 weight percent of one other more highly unsaturated rubber, and containing as sole vulcanizing agents an admixture of sulfur, a lead compound containing oxygen, zinc oxide, and a sulfur-containing accelerator said composition having been vulcanized at about 250° to 400° F. for sufficient time to produce a vulcanizate which is not blistered, cracked or porous, has a tensile strength of at least about 1000 p.s.i., and is substantially completely homogeneous.

7. A vulcanized composition comprising a co-vulcanizable admixture of about 25–90 weight percent of an isoolefin multiolefin Butyl rubber copolymer, about 10–75 weight percent of a more highly unsaturated rubber, and containing as the sole vulcanization agents an admixture of zinc oxide, a sulfur-containing accelerator, sulfur, and a lead compound containing at least about 25 weight percent of an oxide of lead, said composition having been vulcanized at about 280°–320° F. for about 10 to 120 minutes, and being characterized by a tensile strength of at least about 1000 p.s.i. and being substantially free of blisters, cracks and pores, and being substantially completely homogeneous.

8. Vulcanized composition according to claim 7 wherein the Butyl rubber contains the reaction product of a major proportion of iso-butylene and a minor proportion of a $C_4$–$C_{10}$ conjugated diolefin, the more highly unsaturated rubber is selected from the group consisting of natural rubber, rubbery copolymers of butadiene and styrene, rubbery copolymers of butadiene and acrylonitrile and mixtures thereof, the sulfur is present in amounts of about 5 to 25 parts by weight per 100 parts of total rubber hydrocarbons, and the lead compound is selected from the group consisting of oxides of lead, organic esters of lead, and inorganic lead salts containing oxygen; and the vulcanization time is about 20 to 60 minutes.

9. Vulcanized composition according to claim 8 in which the highly unsaturated rubber is a rubbery copolymer of butadiene and styrene.

10. Vulcanized composition according to claim 8 wherein the highly unsaturated rubber is natural rubber.

11. Vulcanized composition according to claim 8 wherein the highly unsaturated rubber is a rubbery copolymer of butadiene and acrylonitrile.

12. Vulcanized composition according to claim 8 in which the lead compound is a lead oxide.

13. Vulcanized composition according to claim 8 in which the lead compound is an organic acid ester.

14. Vulcanized composition according to claim 8 in which the lead compound is an inorganic oxygen-containing lead salt.

15. A process of preparing co-vulcanized blends of an isoolefin-multiolefin Butyl rubber copolymer with a more highly unsaturated rubber, which process comprises adding to about 100 parts by weight of a blend of about 25.0–90.0 weight percent of said Butyl rubber copolymer and about 10.0–75.0 weight percent of a more highly unsaturated rubber, and as sole curatives vulcanizing amounts of sulfur, a sulfur-containing accelerator and zinc oxide, and about 3 to 30 parts by weight of a lead compound containing available lead monoxide and vulcanizing the resulting mixture at a temperature of about 250° to 400° F. and at a co-vulcanization rate faster than the vulcanization rate of either rubber alone.

16. A process according to claim 15 in which the more highly unsaturated rubber is selected from the group consisting of natural rubber, rubbery copolymers of butadiene and styrene, rubbery copolymers of butadiene and acrylonitrile and mixtures thereof, the lead compound is selected from the group consisting of oxides of lead, organic acid esters of lead, and inorganic lead salts containing oxygen, and the co-vulcanization temperature is at about 280° to 320° F.

17. A rubber tire which contains about 25.0–90.0 weight percent of an isoolefin-multiolefin Butyl rubber copolymer which has been co-vulcanized with about 10.0 to 75.0 weight percent of a more highly unsaturated rubber in the presence of, as sole curatives, vulcanizing quantities of sulfur, a sulfur-containing accelerator and zinc oxide, and per 100 parts of total rubber hydrocarbons, about 3–30 parts by weight of a lead compound containing oxygen.

18. In a process for manufacturing a tubeless tire including a carcass member, the combination which comprises at least partially vulcanizing to said carcass member a layer disposed interiorly thereof, which layer comprises a member selected from the group consisting of a rubbery copolymer containing about 20 to 99.5 weight percent of an isoolefin and a minor proportion of a multi-olefin reactive therewith, natural rubber, and at least partially vulcanized reaction products of about 25.0–90.0 weight percent of an unvulcanized rubbery copolymer as above with about 10.0 to 75.0 weight percent of natural rubber, wherein the co-vulcanization has been accomplished in the presence of, as sole curatives, vulcanizing amounts of sulfur, and, per 100 parts by weight of total rubber, about 2 to 50 parts by weight of zinc oxide, about 0.1 to 5 parts by weight of a sulfur-containing vulcanization accelerator, and about 3 to 30 parts by weight of a lead compound containing oxygen selected from the group consisting of oxides of lead, organic esters of lead, and inorganic lead salts containing oxygen, and vulcanizing to said carcass member a layer disposed exteriorly thereof comprising an admixture of about 25 to 90.0 weight percent of a rubbery copolymer containing about 70 to 99.5 weight precent of a $C_4$–$C_7$ isoolefin and a minor proportion of a $C_4$–$C_{14}$ multi-olefin, with about 10.0 to 75.0 weight percent of a more highly unsaturated rubber selected from the group consisting of natural rubber, rubbery copolymers of butadiene and styrene, rubbery copolymers of butadiene and acrylonitrile, mixtures thereof, reclaimed mixtures thereof and partially vulcanized mixtures thereof, and vulcanizing 100 parts by weight of said admixture in the presence of, as sole curatives, vulcanizing quantities of sulfur, about 1.0 to 30 parts by weight of zinc oxide, about 0.1 to 5.0 parts by weight of a sulfur-containing vulcanization accelerator, about 0.1 to 5.0 parts by weight of a sulfur containing vulcanization ultra accelerator and about 3 to 30 parts by weight of a lead compound containing oxygen, said compound being selected from the group consisting of oxides of lead, organic acid esters of lead, inorganic lead salts containing available lead monoxide, and mixtures thereof, at a temperature of about 250° to 400° F., for about 10 to 60 minutes.

19. A vulcanized semi-ebonite rubbery composition comprising a co-vulcanized admixture of about 25.0–90.0 weight percent of an isoolefin-multiolefin Butyl rubber copolymer, about 10.0–75.0 weight percent of a more highly unsaturated rubber, and, as sole curatives, about 10–40 parts by weight of sulfur per 100 parts of total rubbers, and also about 1 to 50 parts by weight of zinc oxide, about 0.1 to 5.0 parts by weight of a sulfur-containing accelerator, and about 3–30 parts by weight of a lead compound containing oxygen; said composition having been vulcanized at about 250°–400° F. and being characterized by a Shore hardness of about 50–100.

References Cited in the file of this patent

UNITED STATES PATENTS

| | | |
|---|---|---|
| 2,557,642 | Dudley | June 19, 1951 |
| 2,575,249 | Connell et al. | Nov. 13, 1951 |
| 2,588,993 | Schroeder | Mar. 11, 1952 |
| 2,676,636 | Sarbach | Apr. 27, 1954 |

FOREIGN PATENTS

| | | |
|---|---|---|
| 724,873 | Great Britain | Feb. 23, 1955 |
| 1,085,801 | France | Aug. 4, 1954 |